United States Patent
Bartelt et al.

(10) Patent No.: US 9,246,569 B2
(45) Date of Patent: Jan. 26, 2016

(54) MOBILE TELECOMMUNICATION SYSTEM USING SOFT-INFORMATION DEQUANTIZER

(71) Applicant: Vodafone GmbH, Dusseldorf (DE)

(72) Inventors: Jens Bartelt, Dresden (DE); Gerhard Fettweis, Dresden (DE)

(73) Assignee: Vodafone GmbH, Düsseldorf (DE)

( * ) Notice: Subject to any disclaimer, the term of this patent is extended or adjusted under 35 U.S.C. 154(b) by 0 days.

(21) Appl. No.: 14/617,132

(22) Filed: Feb. 9, 2015

(65) Prior Publication Data

US 2015/0229380 A1    Aug. 13, 2015

(30) Foreign Application Priority Data

Feb. 7, 2014  (EP) .................................. 14154256

(51) Int. Cl.
| | |
|---|---|
| H04B 7/06 | (2006.01) |
| H04L 25/06 | (2006.01) |
| H04L 27/34 | (2006.01) |
| H04L 1/00 | (2006.01) |
| H04W 88/08 | (2009.01) |

(52) U.S. Cl.
CPC ............ *H04B 7/0639* (2013.01); *H04L 25/067* (2013.01); *H04L 27/34* (2013.01); *H04L 1/0045* (2013.01); *H04L 2001/0097* (2013.01); *H04W 88/08* (2013.01)

(58) Field of Classification Search
CPC ...... H04B 7/0639; H04B 27/34; H04W 88/08
See application file for complete search history.

(56) References Cited

U.S. PATENT DOCUMENTS

| | | | |
|---|---|---|---|
| 8,885,752 B2 * | 11/2014 | Shirani-Mehr et al. | ....... 375/267 |
| 2014/0161203 A1 * | 6/2014 | Nammi et al. | ................ 375/267 |

OTHER PUBLICATIONS

European Search Report for EP 14 15 4256.3 dated Aug. 14, 2014.
Ricardo Blasco-Serrano et al: "Compress-and-Forward Relaying Based on Symbol-Wise Joint Source-Channel Coding", Communications (ICC), 2010 IEEE International Conference on, IEEE, Piscataway, NJ, USA, May 23, 2010, pp. 1-5, XP031702767, ISBN: 978-1-4244-6402-9.
Brice Djeumou et al: "A cheap relaying protocol for orthogonal relay channels", Acoustics, Speech and Signal Processing, 2008. ICASSP 2008. IEEE International Conference on, IEEE, Piscataway, NJ, USA, Mar. 31, 2008, pp. 2533-2536, XP031251106, ISBN: 978-1-4244-1483-3.
Vinayak Nagpal et al: "Coding and System Design for Quantize-Map-and-Forward Relaying", IEEE Journal on Selected Areas in Communications, IEEE Service Center, Piscataway, US, vol. 31, No. 8, Aug. 1, 2013, pp. 1423-1435, XP011521872, ISSN: 0733-8716, DOI: 10.1109/JSAC.2013.130807.

(Continued)

*Primary Examiner* — Dac Ha
(74) *Attorney, Agent, or Firm* — Workman Nydegger

(57) ABSTRACT

A transmission method and corresponding mobile communication system are described. A mobile terminal transmits information via an access channel to a base station that quantizes the received symbols and forwards these via a forward path to a central baseband unit. In the central baseband unit soft information relating to the transmitted information is determined based on received forwarded symbols, a quantizer codebook and the deployed mapping of the mobile terminal. Said soft information may serve as a basis for decoding the information.

12 Claims, 3 Drawing Sheets

(56) References Cited

OTHER PUBLICATIONS

Adnan Raja et al: "Compress-and-forward scheme for a relay network: Approximate optimality and connection to algebraic flows", 2011 IEEE International Symposium on Information Theory Proceedings (ISIT 2011) : St. Petersburg, Russia, Jul. 31-Aug. 5, 2011, IEEE, Piscataway, NJ, Jul. 31, 2011, pp. 1698-1702, XP031971499, DOI: 10.1109/ISIT.2011.6033835 ISBN: 978-1-4577-0596-0.

Iancu Avram et al: "A novel Quantize-and-Forward cooperative system: Channel parameter estimation techniques", 2010 Future Network & Mobile Summit Jun. 18-19, IEEE, IEEE Piscataway, JJ, USA, Jun. 16, 2010, pp. 1-8, XP031922027, ISBN: 978-1-905824-16-8.

Guido Dietl et al: "A Quantize-and-Forward Scheme for Future Wireless Relay Networks", Vehicular Technology Conference (VTC Fall), 2011 IEEE, IEEE, Sep. 5, 2011, pp. 1-4, XP032029598, DOI: 10.1109/VETECF.2011.6093114 ISBN: 978-1-4244-8328-0.

* cited by examiner

MOBILE TELECOMMUNICATION SYSTEM USING SOFT-INFORMATION DEQUANTIZER

CROSS-REFERENCE TO RELATED APPLICATIONS

This application claims priority to European Patent Application Number 14154256.3, filed on Feb. 7, 2014, the entirety of which is incorporated herein by reference.

BACKGROUND OF THE INVENTION

1. The Field of the Invention

The invention relates to transmitting bits representing digital information from a mobile terminal to a central baseband unit.

2. The Relevant Technology

Unless otherwise indicated herein, the materials described in this section are not prior art to the claims in this application and are not admitted to be prior art by inclusion in this section.

Cellular telecommunication systems, also known as mobile networks, typically comprise a radio access network (RAN) coupled to a core network (CN) and a plurality of mobile terminals that are communicatively coupled via a radio link to the RAN. In this way mobile terminals may be coupled to core network via the radio access network. A plurality of radio access network types are known, e.g. the GSM radio access network GRAN, the UMTS radio access networks UTRAN and the E-UTRAN of the so-called LTE network.

A radio cell or a sector of a radio cell is the area defined by the radio coverage of an antenna located at a so-called base station (BS), also known as base transceiver station (BTS). Note that in the following description the term base transceiver station (BTS) shall equally describe so-called eNodeBs or any other radio communications station installed at a fixed location providing the radio interface for the coupling to the mobile stations and used as the terminating end of the radio access network of a cellular communications system.

Besides transmitting radio signals downlink, i.e. from the network side to the mobile terminal, a base transceiver station receives radio signals transmitted uplink, i.e. directed from a mobile terminal to the network side of the communication system. The received radio signal may undergo some analog processing, e.g. the received analog signal may be amplified by a low-noise amplifier LNA, before being digitized by an analog-to-digital circuit. Once the received signal has been digitized, i.e. the signal is represented by complex values, it can be further processed using digital circuitry. For example in early conventional base transceiver stations, e.g. in the GSM system, the received signal is demodulated thus retrieving the transmitted binary information that in turn was forwarded to the network for further routing and processing.

For mobile radio networks so-called cloud architectures have come to the focus of attention. In such networks signal processing that is usually executed in remote base stations is executed in a centralized baseband unit (BBU). One example is the so-called Cloud Radio Access Network (C-RAN) where base stations are degraded to mere remote radio heads (RRHs) that in the uplink only down-convert the received signals from the respective carrier frequency to baseband frequency and then digitize the down-converted received signal by sampling and quantizing thus producing a stream of digital complex I/Q samples. Said stream of I/Q samples is forwarded via a fast high capacity wired or wireless link towards the centralized baseband unit BBU where the signal is dequantized to reconstruct the signal that was originally received at the remote radio head. The signal processing performed in the BBU thus is similar to that in a conventional base transceiver station including the demodulation of the reconstructed received signal and the decoding of the access channel's forward error correction (FEC), but wherein the baseband unit receives and processes a plurality of I/Q sample streams from a corresponding plurality of RRHs.

The centralized processing of signals originating from a plurality of remote radio heads may provide for improved energy efficiency, scalability, a potential benefit from load-balancing and joint processing of the plurality of received signals.

However, the quantization of a received signal introduces distortion into the quantized signal, i.e. due to the discrete quantization intervals an error is introduced by the quantization and dequantization process. To mitigate these effects quantizers are designed for low quantization errors.

In addition, the use of quantizers and particularly the use of corresponding dequantizers comes at the cost of losing soft information during quantization. When considering that transmitted digital data is not merely represented by hard bits with a value of either "0" or "1", but instead is associated with information how reliable the value of a transmitted bit can be decoded. This information is known as soft information and typically reflects the probability of a bit being 1 or 0. In one embodiment this soft information is represented by a logarithmic likelihood ratio, i.e. so-called LLR. The soft information of a transmitted bit can be computed during detection if statistical knowledge of the random process that underlies the transmission, i.e. the signal to noise ration SNR of a considered average white Gaussian noise channel, AWGN, is available.

Furthermore, when transmitting a quantized value via a forwarding channel, the soft information associated with the quantized value, i.e. the quantization bits, typically is not considered at the receiver side of the forwarding channel during dequantization and is thus unavailable for any subsequent processing, thus increasing the end-to-end bit error rate.

Hence there is a need to at least partially improve the processing of uplink signals using centralized processing.

BRIEF SUMMARY

The invention relates to a method for transmitting bits representing digital information from a mobile terminal to a central baseband unit comprising transmission of the bits via an access channel to a base transceiver station, quantizing and forwarding the received signals to a central baseband unit and determining probability information of the bits at the central baseband unit. Lastly the determined probability information can be used for determining the originally transmitted bits. Furthermore a corresponding transmission system comprising at least one base transceiver station and a central baseband unit are described.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
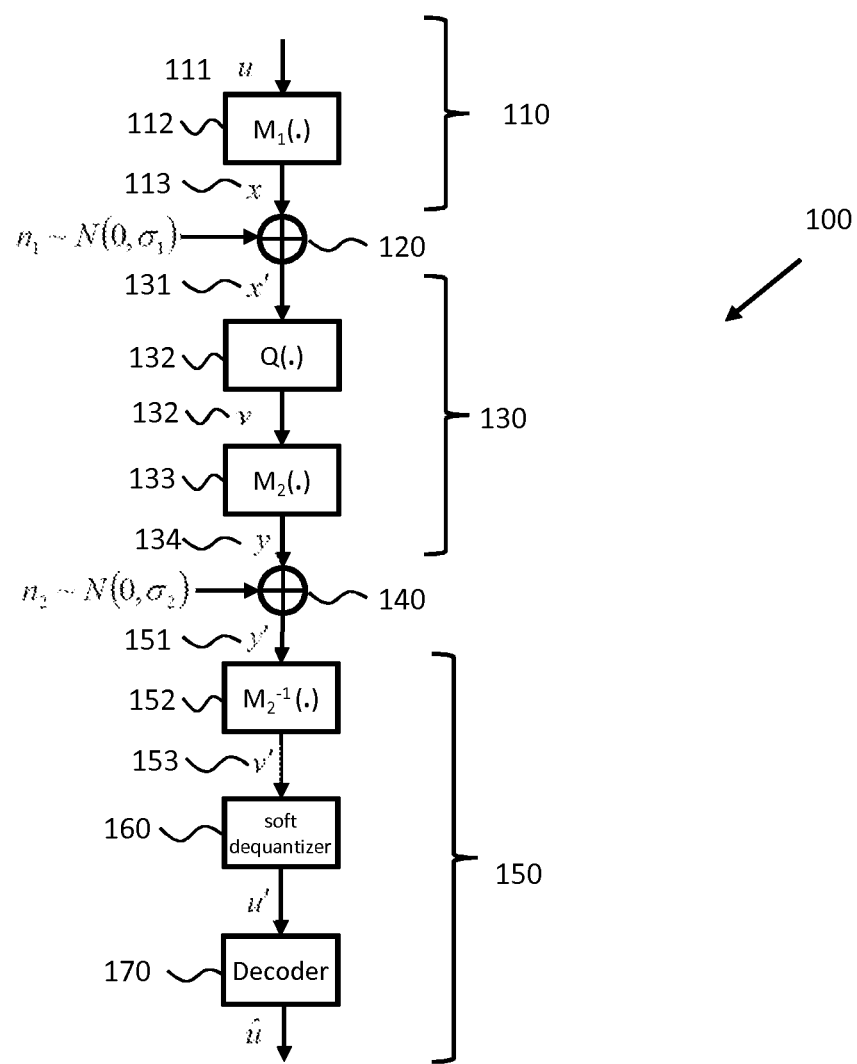
FIG. 1 illustrates a schematic of an uplink transmit path from a mobile terminal to a central base band processing unit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

FIG. 1 illustrates a schematic of an uplink transmit path from a mobile terminal 110 in a cellular radio communication system to a central base band processing unit.

The mobile terminal may be of arbitrary type and may comprise conventional functionality for producing digital information in the form of transmit bits that shall be transmitted. Accordingly the mobile terminal may be a cell phone, a computer comprising a radio interface to the cellular radio system or any other device capable of producing transmit bits that shall be transmitted via the cellular radio system. The mobile terminal may correspondingly comprise functional blocks adapted and configured for producing and radiating transmit bits, wherein details of the actual implementation is of minor interest here, since these are not relevant for the processing of the received signals. Consequently in the following description the functions of the mobile terminal are described only as far as these are relevant for the proposed transmission scheme.

Similarly the functions of the network side are described only as far as relevant for the proposed transmission scheme and the processing on the network side, wherein the functions are described as implemented by functional blocks. The location of an implementation of a functional block is as described below.

Also note that the transmission of symbols from a terminal uplink to the network side as described in the following shall be exemplary for a plurality of transmissions originating from a plurality of mobile terminals. The plurality of transmitted signals is received by a plurality of base transceiver stations, and the received signals are processed by a plurality of processing chains as described in the following. In this way the processing as described in the following shall be exemplary for a plurality of transmissions.

In exemplary mobile terminal 110 digital information represented by a stream of binary data, i.e. transmit bits of bit vector $u=(u_1 \ldots, u_k, \ldots, u_K)$ referenced by numeral 111 are fed into a mapper that maps the transmit bits to symbols according to a first arbitrary digital modulation scheme, e.g. a QAM constellation or any other digital constellation. Said mapper 112, $M_1$, outputs a stream of symbols $x=M_1(u)$ denoted by reference numeral 113 that is fed as input into a modulator, which modulates a carrier wave and outputs a signal. Said signal may be output by the modulator as an analog signal or may be output as digital signal that is converted to an analog signal, which then may be processed analogously before it is finally radiated via an antenna.

Note that transmit bits u may be bits that have been source encoded, i.e. redundant information has been removed from the payload information, and channel encoded, i.e. redundant information for error correction purposes, i.e. so-called forward error correction FEC, has been added to the source encoded data bits. In one embodiment the channel encoding may be an encoding particularly suitable for soft decoding, as for example turbo-codes or low density parity check codes, LDPC, so the receiver side may deploy soft decoding algorithms, as for example BCJR, soft Viterbi or belief propagation decoding for determining the transmit bits.

Subsequently terminal 110 radiates the signal representing the symbols x which in turn represent transmit bits u.

The radiated signal then travels through an access channel 120, i.e. a radio channel enabling the mobile terminal to access the network side of the mobile communications system. In the described embodiment access channel 120 may be the first channel to be considered in this architecture, another i.e. second transmission channel is described later on. The access channel distorts the radiated signal by adding noise and distorting the signal due to various well known effects. In FIG. 1 the access channel is represented by the add operator ⊕ that adds noise $n_1 \sim N(0, \sigma_1)$ to the radiated symbol x thus producing distorted symbols $x'=x+n_1$.

Note that in one embodiment it is assumed that the access channel adds white Gaussian noise to the transmitted signal, i.e. access channel 120 is assumed to be an AWGN channel, wherein it is further assumed that the access channel can be perfectly equalized. However, other channel models may be considered as long as their statistical characteristics are known. However, the disclosed system and in particular the soft dequantizer shall not be limited in this regard.

The radio signal 131 representing the distorted symbols x' is then received by at least one base transceiver station, i.e. BTS, 130. Note that BTS 130 shall denote any access terminal of the network side of the communication system that provides the radio interface for receiving and basic processing of radio signals radiated by mobile terminals. Note that according to other terminology a BTS station may be also called remote radio head RRH or eNode-b according to UMTS terminology.

The analog signal representing the distorted symbols x' as received by an antenna of BTS 130 then may be amplified by an analog low-noise amplifier—not shown in FIG. 1—in order to provide a signal having an amplitude suitable for the next processing step.

The analog signal representing x' then can be down converted by an analog mixer to baseband frequency, thus producing a signal in baseband frequency representing x'. The baseband signal is then sampled and quantized. The quantizer maps the baseband signal to one of a finite plurality of baseband signal intervals, wherein each baseband signal interval may be considered as a codeword. The finite set of codewords forms the codebook of the quantizer. Upon quantization the quantizer takes a sample of the baseband signal as input, maps the sample to the best matching interval of baseband signal intervals, i.e. to a codeword, and provides the index of that interval/codeword as output. Vice versa, i.e. when dequantizing, the dequantizer takes the index of a codeword, i.e. the index of a previously determined interval, as input value and provides one value, i.e. a discrete predetermined baseband signal value representing the corresponding interval, as dequantizer output value. The quantizing of a value thus can be considered as a lossy operation.

In one embodiment the quantization of the baseband samples can be a codebook quantization with a quantizing resolution of B bits by choosing an index $c_q$ denoting the most suitable codeword of quantizing codebook q wherein the codewords are indexed by codebook indices $C=\{c_1, \ldots, c_q, \ldots, c_{2^B}\}$. In other words the codeword associated with the determined codebook index reflects the sampled amplitude of the received signal in baseband frequency. Each quantizer codebook index also serves as index of a codeword of a decoding codebook $Q^{+1}$ ($c_q$). Accordingly, based on the selected index of codebook q used for encoding a received symbol x', said codebook index $c_q$ can be used later for determining the received symbol x'. The most suitable codeword of codebook q typically is based on decision thresholds defining the interval boundaries wherein these thresholds can be chosen arbitrarily, i.e. non-linear and non-regular quantizers can be used without restriction.

Each index $c_q$ of a codeword of codebook q is an integer value that can be represented as a vector of length B of codeword bits $c_q=\{c_{q,1}, \ldots, c_{q,b}, \ldots, c_{q,B}\}$.

Thus a vector v of bits, in FIG. 1 referenced by numeral 132, that represent the codeword index bits is $v=Q(x')=(v_1, \ldots, v_b, \ldots, v_B)$, with v being one of the possible codebook indices $c_q$, appropriately chosen from C.

Bit vector v is then mapped by mapper $M_2$ to a symbol $y=M_2(v)$, in FIG. 1 referenced by numeral 133 and 134 respectively, thus obtaining a symbol reflecting the bits of the determined codeword index $c_q$. Note that in an alternative embodiment the B bits of bit vector v may be mapped to more or fewer than one symbol depending on the signal constellation of the deployed modulation scheme. Optionally—not shown in the figures—the bits of vector v may be channel encoded before being mapped by mapper $M_2$, wherein the channel encoding is suitable for a soft decoder at the receiver side of forward channel 140.

Base transceiver station 130 then forwards symbol y, i.e. more particularly a stream of symbols y representing the bits of the codeword indices, which in turn represent quantized received symbols x', via forwarding channel 140 to base band processing unit BBU 150. Said forwarding channel, i.e. above mentioned second channel 140, is assumed to be lossy, i.e. channel 140 distorts the forwarded symbols y by adding noise $n_2 \sim N(0, \sigma_2)$ and by distorting the symbols due to well-known channel effects. The symbols as received via forwarding channel 140 thus are distorted symbols $y'=y+n_2$.

Note that the term base band unit is used to describe the entity arranged in the network of the communication system that is coupled to at least one, preferably to a plurality of base transceiver stations 130 that receive and quantize symbols radiated by mobile terminals 110 and forward symbols representing the codeword indices of the quantized radio symbols via forwarding channels 140 to the BBU 150. Note that this second channel, i.e. forwarding channel 140, typically is a high speed transmission channel, i.e. a so-called backhaul link, implemented as a wired copper line or optical fiber or a fast wireless link.

The distorted symbols y' of at least one base transceiver station are received by baseband processing unit 150. In an optional very first step the received analog signal representing symbols y' may be amplified to provide amplitude to the signal suitable for the next processing step.

The distorted symbols y' then are demodulated and demapped by demapper $M_2^{-1}$. During the demapping the soft information, i.e. the probability information, corresponding to each bit of a bit vector v' can be determined as $P(v_b=0|y')=M_2^{-1}(y')$ by well-known methods that exploit the knowledge on the second channel's statistical properties. This can be considered as taking the distortion of a received symbol into account when determining the symbol closest to the received symbol y', thus providing a probability value $P(v_b=0|y')$ indicating the reliability of bit $v_b$ of bit vector v'.

Note that in case the bits of vector v have been channel encoded at base station 130, the demodulated symbols y' must be channel decoded—not shown in the figures—after the symbols are passed to demapper $M_2^{-1}$ wherein the decoder provides updated soft information as output. This optional channel encoding further reduces the bit error rate of transferring the bits of vector v via the forwarding channel.

Figure 2:
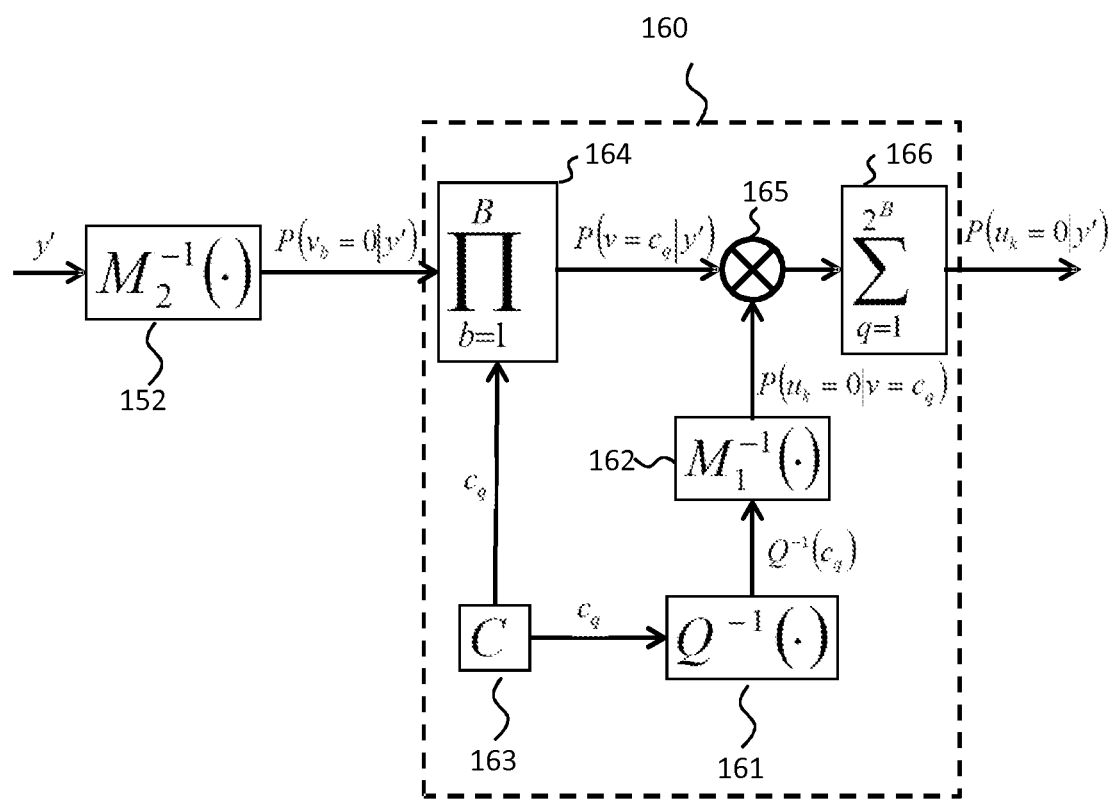
FIG. 2 illustrates an embodiment of a soft dequantizer.

FIG. 2 illustrates the soft dequantizer of FIG. 1 in more detail, i.e. the depicted soft dequantizer is a more detailed block diagram of the dequantizer 160 depicted in FIG. 1.

Soft dequantizer 160 has knowledge of a decoding codebook $Q^{-1}$ as referenced by numeral 161 in FIG. 2. Note that said codebook $Q^{-1}$ to some extent corresponds to the codebook used in the base transceiver station 130 for quantizing the analog received signal x', but differs from quantizer codebook Q in that the codewords of the quantizer codebook are intervals while the codewords of the dequantizer codebook $Q^{-1}$ are discrete values. Furthermore the soft dequantizer comprises knowledge about the modulation deployed in the mobile terminal 110.

The soft information $P(v_b=0|y')$ provided by demapper 152 corresponds to v' in FIG. 1 and is passed to multiplier block 164. Multiplier 164 calculates for each possible codeword index $c_q$ the conditional probability that the actual transmitted v was equal to this index $c_q$, by multiplying the bit probabilities of the corresponding bits $v_b$, yielding $P(v=c_q|y')=\Pi_{b=1}^B P(v_b=c_{q,b}|y')$, i.e. the probability of bit vector v being $c_q$ under the assumption of y' being received.

Note that the information about the bits of $c_q$ can be provided by an appropriate functional block C, e.g. as depicted by block 163 and that stores and provides all codewords corresponding to indices $c_q$. Alternatively, this information may be stored in multiplier 164 thus enabling the multiplier to access that information without any delay. All calculated index probabilities are then passed to multiplier 165 for multiplying these with the probabilities $P(u_k=0|v=c_q)$, i.e. the probability of a transmit bit $u_k$ being zero under the assumption that the transmitted v being $c_q$.

Bit probabilities $P(u_k=0|v=c_q)$ are provided by demapper $M_1^{-1}$, i.e. block 162, based on the values $Q^{-1}(c_q)$, i.e. the amplitude values corresponding to $c_q$. In other words demodulator block 162 soft-demodulates each of the dequantizer codewords, i.e. $M_1^{-1}(Q^{-1}(c_q))$, which results in the soft information of the bits $u_k$ under the condition that $c_q$ was forwarded, i.e. $P(u_k=0|v=c_q)=M_1^{-1}(Q^{-1}(c_q))$.

In one embodiment the probability values $P(u_k=0|v=c_q)$ may be stored in the dequantizer, e.g. in a storage means of multiplier 165 hosting a lookup table, as a precalculated set of values. Due to the fact that the predefined codebook of quantizer Q and information about the mapping $M_1$ deployed for transmitting bits u via access channel 120 are known at baseband unit 150, the probabilities $P(u_k=0|v=c_q)$ can be calculated and stored in the soft dequantizer 160 at any time.

Based on the information provided by multiplier 165, i.e. the multiplication of $P(v_b=c_q|y')$ and $P(u_k=0|v=c_q)$, block 166 calculates the soft information on the original bits $u_k$ according to the law of total probability as $P(u_k=0|y')=\Sigma_{q=1}^{2^B} P(u_k=0|v=c_q) \cdot P(v=c_q|y')$.

Note that this soft information on the original bits is more accurate than in conventional systems since soft information reflecting the probability of correct transmission via the access channel 120 and the soft information reflecting the probability of correct transmission via the forward channel 140 are considered when finally decoding the symbols in base band unit 150. A conventional dequantizer would just choose v to be the most probable $c_q$, thus making a premature hard decision and losing any information on the reliability information available on v.

Dequantizer 160 in this way receives soft information $P(v_b=0|y')$ from demapper 152 reflecting the probability of the bits $v_b$ under the assumption of y' being received. As output dequantizer 160 provides soft information i.e. probability information $P(u_k=0|y')$ on transmit bits denoted by u' in FIG. 1. Thus dequantizer 160 implements a soft dequantizer.

As shown in FIG. 1 the output u' of soft dequantizer 160 can be forwarded to a final decoder 170 for further processing i.e. final decoding. In one embodiment said final decoder may decide about the hard bits u based on the provided soft information u'. In an alternative embodiment, a turbo or a soft decoder, e.g. an LDPC decoder or a BCJR or soft Viterbi, may be communicatively coupled to dequantizer 160 for further processing bits u' and related soft information provided that in the mobile station 110 bits u have been encoded correspondingly.

Figure 3:
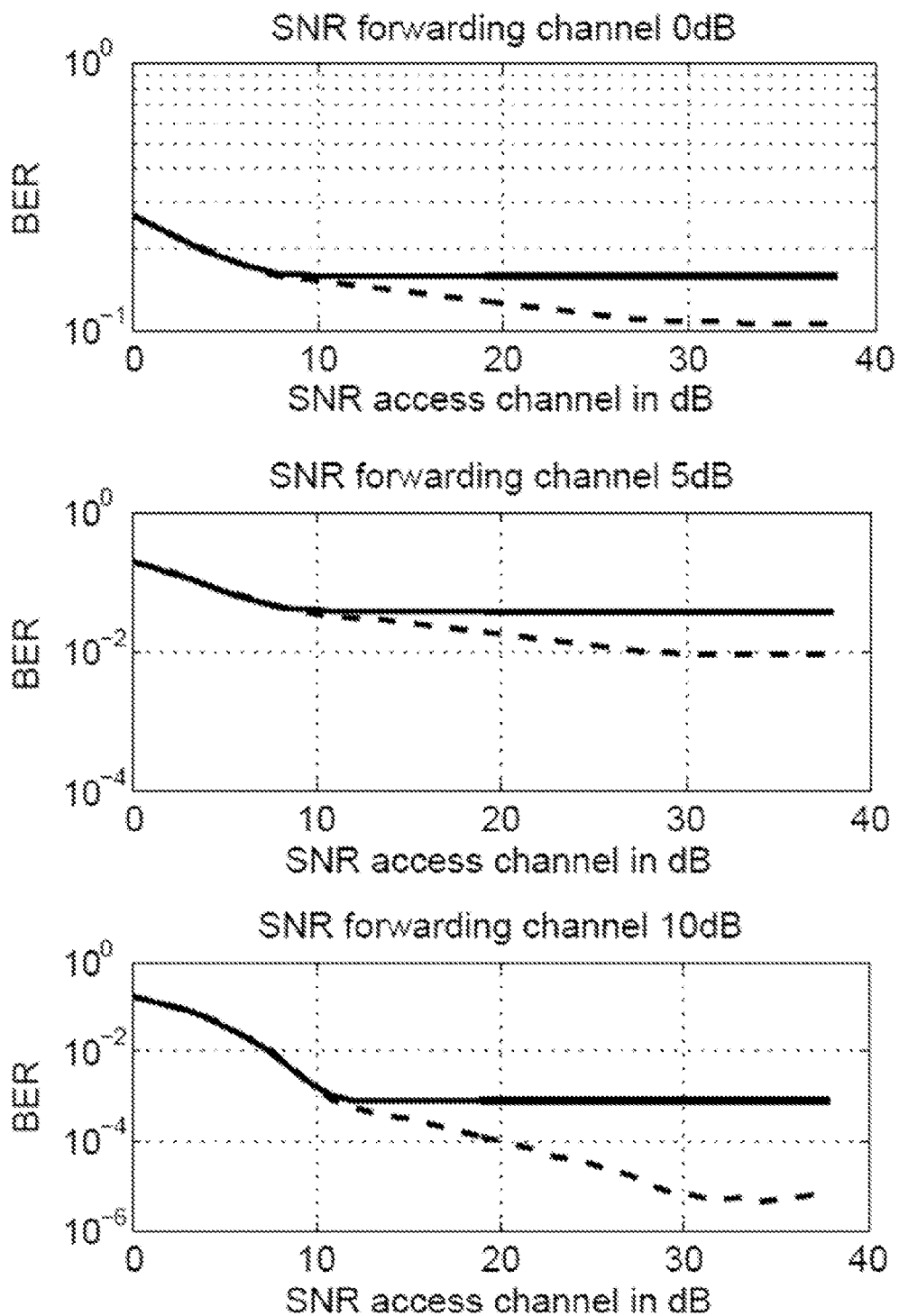
FIG. 3 illustrates a comparison of the performance of a conventional dequantizer and a soft dequantizer.

FIG. 3 illustrates the performance of the described soft dequantizer when compared to a conventional hard-decision dequantizer using simulations in Matlab, wherein a transmission model of a quantize-and-forward system as depicted in FIG. 1 has been assumed. Note that the topmost illustration assumes a forwarding channel exhibiting a signal-to-noise ratio SNR of 0 dB, the illustration below assumes a forwarding channel having an SNR of 5 dB and the bottom illustration depicts the simulation result for a forwarding channel having an SNR of 10 dB. The modulation scheme used for modulations $M_1$ and $M_2$ is considered as 4-QAM and the use of a linear, uniform quantizer with a resolution of B=8 bit is assumed. The solid lines depict the bit error rate BER of uncoded conventional dequantizer while the dashed line depicts the BER of an uncoded soft-dequantizer as described above. The end-to-end bit error rate of $\hat{u}_k$ for approximately $10^7$ uncoded transmissions for various SNRs of the access and forwarding channel. As can be seen, the conventional dequantizer hits a very high error floor because errors introduced by the hard decision after the forwarding channel cannot be compensated by a higher access channel SNR. In contrast thereto the soft-dequantizer hits a much lower error floor, which shows the benefit of the preserving of soft information throughout dequantization. The gains in terms of BER, i.e. bit error ratio, are up to two orders of magnitude.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for transmitting digital information represented by a plurality of transmit bits from a mobile terminal to a central baseband unit comprising the steps of:
   mapping at least one of the plurality of transmit bits to at least one symbol based on a first mapping and transmitting the first symbol via an access channel;
   receiving a radio signal representing the at least one symbol at a base transceiver station;
   quantizing the received radio signal based on a codebook thus obtaining an index of a codeword of the codebook, and
   mapping the codeword index to a second symbol at the base transceiver station;
   transmitting the second symbol via a forward path to the central baseband unit;
   receiving and demapping the second symbol at the central baseband unit while preserving soft-information associated with the received second symbol;
   in a dequantizer comprised in the central baseband unit, determining bit probability information for all quantizer codeword index bits based on the soft-information associated with the second symbol;
   using the bit probability information of the codeword index bits for providing a probability for each possible value of the codeword index;
   determining probability information of the transmit bits by combining the probability information of each possible value of the codeword index with the bit probabilitiy of a transmitted bit conditioned on the corresponding codeword index; and
   determining the transmit bits based on the determined bit probability information of the transmit bits.

2. The method of claim 1 wherein the processing unit is a base band unit communicatively coupled to a plurality of base transceiver stations.

3. The method of claim 1, wherein the step of transmitting the first symbol via an access channel is performed by a mobile terminal.

4. The method of claim 1, wherein the step of decoding comprises decoding by a soft decoder.

5. The method of claim 1, wherein the bit probabilities of all dequantizer codewords are stored as precalculated values in the dequantizer.

6. The method of claim 1 wherein the codeword index information is channel encoded before being mapped to a second symbol, and wherein the second symbol as received at the central baseband unit is channel decoded using a soft-decoder after the symbol is demapped.

7. A mobile communication system comprising:
   a base transceiver station configured for receiving a radio signal representing a first symbol transmitted via an access channel, wherein said first symbol represents at least one of a plurality of transmit bits according to a first mapping, said base transceiver station further configured for quantizing the received radio signal based on a codebook thus obtaining an index of a codeword of the codebook and mapping said codeword index to a second symbol and transmitting said second symbol via a forward path;
   a central baseband unit configured for receiving and demapping the second symbol while preserving soft-information associated with the received second symbol;
   a dequantizer adapted for determining probability bit probability information for all quantizer codeword index bits based on the soft-information associated with the second symbol and using the probability information of the codeword index bits for providing a probability for each possible value of the codeword index, and determining probability information of the transmit bits by combining the probability information of each possible value of the codeword index with the bit probability of a transmitted bit conditioned on the corresponding codeword index; and a decoder for determining the transmit bits based on the determined probability information of the transmit bits.

8. The system of claim 7, wherein the central baseband unit is communicatively coupled to a plurality of base transceiver stations.

9. The system of claim 7, wherein the step of transmitting the first symbol via an access channel is performed by a mobile terminal.

10. The system of claim 7, wherein the decoder is a soft decoder.

11. The system of claim 7, wherein the codeword index information is channel encoded before being mapped to a second symbol, and wherein the second symbol as received at the central baseband unit is channel decoded using a soft-decoder after the symbol is demapped.

12. The system of claim 7, wherein the dequantizer is adapted to store the bit probabilities of all dequantizer codewords as precalculated values.

* * * * *